US010552701B2

(12) United States Patent
Menon

(10) Patent No.: US 10,552,701 B2
(45) Date of Patent: Feb. 4, 2020

(54) SYSTEM AND METHOD FOR DETECTING THE SOURCE OF MEDIA CONTENT WITH APPLICATION TO BUSINESS RULES

(75) Inventor: Satish Menon, Sunnyvale, CA (US)

(73) Assignee: OATH INC., New York, NY (US)

( * ) Notice: Subject to any disclaimer, the term of this patent is extended or adjusted under 35 U.S.C. 154(b) by 2596 days.

(21) Appl. No.: 12/024,572

(22) Filed: Feb. 1, 2008

(65) Prior Publication Data

US 2009/0196465 A1 Aug. 6, 2009

(51) Int. Cl.
*G06K 9/32* (2006.01)
*G06F 21/10* (2013.01)
*G06F 21/16* (2013.01)
*H04L 29/06* (2006.01)

(52) U.S. Cl.
CPC .......... *G06K 9/3233* (2013.01); *G06F 21/10* (2013.01); *G06F 21/16* (2013.01); *G06K 2209/27* (2013.01); *H04L 63/1408* (2013.01)

(58) Field of Classification Search
USPC .......................................................... 705/51
See application file for complete search history.

(56) References Cited

U.S. PATENT DOCUMENTS

| | | | | |
|---|---|---|---|---|
| 4,411,015 A | * | 10/1983 | Scherl et al. ................. | 382/171 |
| 5,594,796 A | * | 1/1997 | Grube ..................... | H04L 9/321 |
| | | | | 380/270 |
| 5,710,834 A | * | 1/1998 | Rhoads ......................... | 382/232 |
| 5,721,788 A | * | 2/1998 | Powell et al. ................ | 382/100 |
| 5,765,152 A | * | 6/1998 | Erickson | |
| 5,809,160 A | * | 9/1998 | Powell et al. ................ | 382/100 |
| 5,864,241 A | * | 1/1999 | Schreck ................. | G11B 5/455 |
| | | | | 324/699 |
| 5,933,498 A | * | 8/1999 | Schneck ................. | G06F 21/10 |
| | | | | 705/54 |
| 5,974,141 A | * | 10/1999 | Saito ............................. | 705/52 |

(Continued)

FOREIGN PATENT DOCUMENTS

| | | | | |
|---|---|---|---|---|
| EP | 1630641 A1 | * | 3/2006 | ............. G06F 21/10 |
| JP | 2002-366531 A | | 12/2002 | |

(Continued)

OTHER PUBLICATIONS

Mourad et al (Securing Digital Content), 2007 (Year: 2007).*

(Continued)

*Primary Examiner* — Mamon Obeid
(74) *Attorney, Agent, or Firm* — James J. DeCarlo; Greenberg Traurig, LLP

(57) ABSTRACT

A system and method for protecting copyright in content distributed online, in combination with specified business rules. A portion of content presented for upload on a network is analyzed to detect an image associated with a content owner; the image is compared with reference images to identify the content owner; and business rules are applied to control unauthorized uploading of the content. The identifier may be a logo included in the content as a digital graphic, or a non-visual marker. Analysis is advantageously performed on a sample of video frames or a segment of preselected length. If the content is found to be copyrighted, and the attempted upload is unauthorized, uploading may or may not be permitted, and the user may or may not be charged a fee for subsequent access to the content.

14 Claims, 6 Drawing Sheets

(56) References Cited

U.S. PATENT DOCUMENTS

| | | | | |
|---|---|---|---|---|
| 6,105,006 A * | 8/2000 | Davis | G06Q 20/10 | |
| | | | 235/379 | |
| 6,122,403 A * | 9/2000 | Rhoads | 382/233 | |
| 6,173,332 B1 * | 1/2001 | Hickman | H04L 67/42 | |
| | | | 370/270 | |
| 6,311,214 B1 * | 10/2001 | Rhoads | 709/217 | |
| 6,314,408 B1 * | 11/2001 | Salas | G06F 16/958 | |
| | | | 705/54 | |
| 6,314,425 B1 * | 11/2001 | Serbinis | G06F 21/6218 | |
| 6,343,323 B1 * | 1/2002 | Kalpio | G06Q 20/102 | |
| | | | 705/34 | |
| 6,553,129 B1 * | 4/2003 | Rhoads | 382/100 | |
| 6,681,233 B1 * | 1/2004 | Ichikawa | H04L 63/0428 | |
| 6,738,495 B2 * | 5/2004 | Rhoads et al. | 382/100 | |
| 6,898,299 B1 * | 5/2005 | Brooks | G06K 9/00 | |
| | | | 340/5.52 | |
| 7,054,461 B2 * | 5/2006 | Zeller et al. | 382/100 | |
| 7,098,931 B2 * | 8/2006 | Patterson et al. | 345/634 | |
| 7,260,555 B2 * | 8/2007 | Rossmann | G06F 21/6209 | |
| | | | 705/50 | |
| 7,299,498 B2 * | 11/2007 | Lee | G06Q 30/06 | |
| | | | 380/200 | |
| 7,428,591 B2 * | 9/2008 | Stebbings | G06Q 20/40 | |
| | | | 380/201 | |
| 7,469,230 B2 * | 12/2008 | Vaidyanathan et al. | 705/53 | |
| 7,613,427 B2 * | 11/2009 | Blight | G01S 5/02 | |
| | | | 455/41.1 | |
| 7,677,436 B2 * | 3/2010 | Ohno et al. | 235/375 | |
| 7,778,929 B2 * | 8/2010 | Corbett | 705/59 | |
| 7,788,481 B2 * | 8/2010 | Bik | H04L 63/0227 | |
| | | | 709/238 | |
| 7,822,687 B2 * | 10/2010 | Brillon et al. | 705/59 | |
| 7,844,549 B2 * | 11/2010 | Strickland | 705/59 | |
| 7,895,311 B1 * | 2/2011 | Juenger | G06F 21/10 | |
| | | | 709/223 | |
| 7,937,588 B2 * | 5/2011 | Picard | G06T 1/0042 | |
| | | | 713/176 | |
| 7,945,924 B2 * | 5/2011 | Li | H04L 43/00 | |
| | | | 380/201 | |
| 8,040,883 B2 * | 10/2011 | Keeler | H04L 29/12518 | |
| | | | 370/389 | |
| 8,059,858 B2 * | 11/2011 | Brundage et al. | 382/100 | |
| 8,122,488 B2 * | 2/2012 | Hoch | H04L 63/08 | |
| | | | 705/14.1 | |
| 8,230,149 B1 * | 7/2012 | Long | G06F 21/85 | |
| | | | 710/305 | |
| 8,286,241 B1 * | 10/2012 | Yeo | H04L 63/101 | |
| | | | 726/11 | |
| 8,583,039 B2 * | 11/2013 | Kammer | H04W 8/005 | |
| | | | 370/310 | |
| 8,925,106 B1 * | 12/2014 | Steiner | G06F 21/31 | |
| | | | 726/28 | |
| 9,037,676 B1 * | 5/2015 | Lundh | G06F 16/00 | |
| | | | 709/217 | |
| 9,097,544 B2 * | 8/2015 | Dhanani | H04W 4/029 | |
| 9,165,125 B2 * | 10/2015 | Zarei | G06F 21/31 | |
| 2002/0012445 A1 * | 1/2002 | Perry | 382/100 | |
| 2002/0032905 A1 * | 3/2002 | Sherr | G06F 21/10 | |
| | | | 725/38 | |
| 2002/0049738 A1 * | 4/2002 | Epstein | 707/1 | |
| 2002/0124024 A1 * | 9/2002 | Patterson et al. | 707/517 | |
| 2002/0138440 A1 * | 9/2002 | Vaidyanathan et al. | 705/54 | |
| 2002/0147929 A1 * | 10/2002 | Rose | 713/201 | |
| 2002/0164023 A1 * | 11/2002 | Koelle | G06F 21/552 | |
| | | | 380/201 | |
| 2002/0165811 A1 * | 11/2002 | Ishii | G06Q 30/0601 | |
| | | | 705/36 R | |
| 2003/0076955 A1 * | 4/2003 | Alve | G06F 21/10 | |
| | | | 380/201 | |
| 2003/0110131 A1 * | 6/2003 | Alain | G06F 21/6209 | |
| | | | 705/51 | |
| 2003/0120601 A1 * | 6/2003 | Ouye | G06F 21/6209 | |
| | | | 705/51 | |
| 2003/0156733 A1 * | 8/2003 | Zeller et al. | 382/100 | |
| 2003/0233462 A1 * | 12/2003 | Chien | G06F 21/10 | |
| | | | 709/229 | |
| 2004/0015445 A1 * | 1/2004 | Heaven | G06F 21/10 | |
| | | | 705/51 | |
| 2004/0107368 A1 * | 6/2004 | Colvin | G06F 21/121 | |
| | | | 726/30 | |
| 2004/0117631 A1 * | 6/2004 | Colvin | G06F 21/121 | |
| | | | 713/179 | |
| 2004/0117644 A1 * | 6/2004 | Colvin | G06F 21/121 | |
| | | | 713/193 | |
| 2004/0117664 A1 * | 6/2004 | Colvin | G06F 21/121 | |
| | | | 726/30 | |
| 2004/0133797 A1 * | 7/2004 | Arnold | G06F 21/10 | |
| | | | 726/27 | |
| 2004/0181671 A1 * | 9/2004 | Brundage et al. | 713/176 | |
| 2004/0194100 A1 * | 9/2004 | Nakayama | G06F 9/468 | |
| | | | 718/100 | |
| 2004/0221118 A1 * | 11/2004 | Slater et al. | 711/163 | |
| 2004/0243634 A1 * | 12/2004 | Levy | G06F 21/10 | |
| 2004/0263911 A1 * | 12/2004 | Rodriguez et al. | 358/3.28 | |
| 2005/0027999 A1 * | 2/2005 | Pelly | G06F 21/10 | |
| | | | 713/194 | |
| 2005/0070248 A1 * | 3/2005 | Gaur | G11B 20/00086 | |
| | | | 455/410 | |
| 2005/0097059 A1 * | 5/2005 | Shuster | G06Q 30/06 | |
| | | | 705/59 | |
| 2005/0102381 A1 * | 5/2005 | Jiang | H04L 63/101 | |
| | | | 709/220 | |
| 2005/0154608 A1 * | 7/2005 | Paulson et al. | 705/1 | |
| 2005/0160271 A9 * | 7/2005 | Brundage et al. | 713/176 | |
| 2005/0218206 A1 * | 10/2005 | Ohno et al. | 235/375 | |
| 2005/0278297 A1 * | 12/2005 | Nelson | 707/1 | |
| 2006/0005252 A1 * | 1/2006 | Chu et al. | 726/26 | |
| 2006/0010075 A1 * | 1/2006 | Wolf | G06Q 30/06 | |
| | | | 705/57 | |
| 2006/0149727 A1 * | 7/2006 | Viitaharju | G06F 21/10 | |
| 2006/0161635 A1 * | 7/2006 | Lamkin | G06F 16/4387 | |
| | | | 709/217 | |
| 2006/0272031 A1 * | 11/2006 | Ache | G06F 21/10 | |
| | | | 726/28 | |
| 2007/0011242 A1 * | 1/2007 | McFarland | G06F 8/20 | |
| | | | 709/205 | |
| 2007/0016790 A1 * | 1/2007 | Brundage et al. | 713/176 | |
| 2007/0033408 A1 * | 2/2007 | Morten | H04L 63/1408 | |
| | | | 713/176 | |
| 2007/0078773 A1 * | 4/2007 | Czerniak | G06F 21/10 | |
| | | | 705/57 | |
| 2007/0203841 A1 * | 8/2007 | Maes | H04L 63/08 | |
| | | | 705/52 | |
| 2007/0234291 A1 * | 10/2007 | Ronen | G06F 8/36 | |
| | | | 717/120 | |
| 2008/0040807 A1 * | 2/2008 | Lu et al. | 726/26 | |
| 2008/0046915 A1 * | 2/2008 | Haeuser | H04N 7/17318 | |
| | | | 725/25 | |
| 2008/0071617 A1 * | 3/2008 | Ware | 705/14 | |
| 2008/0091681 A1 * | 4/2008 | Dwivedi | G06F 21/31 | |
| 2008/0270307 A1 * | 10/2008 | Olson | G06F 21/10 | |
| | | | 705/51 | |
| 2008/0289006 A1 * | 11/2008 | Hock | H04L 63/08 | |
| | | | 726/4 | |
| 2009/0083228 A1 * | 3/2009 | Shatz et al. | 707/3 | |
| 2009/0138486 A1 * | 5/2009 | Hydrie et al. | 707/10 | |
| 2009/0165031 A1 * | 6/2009 | Li | G06F 21/10 | |
| | | | 725/22 | |
| 2009/0171970 A1 * | 7/2009 | Keefe | G06Q 10/10 | |
| 2009/0196465 A1 * | 8/2009 | Menon | G06F 21/10 | |
| | | | 382/118 | |
| 2009/0286509 A1 * | 11/2009 | Huber | G06Q 20/1235 | |
| | | | 455/410 | |
| 2010/0223472 A1 * | 9/2010 | Alvarsson | G06F 21/10 | |
| | | | 713/176 | |
| 2011/0208761 A1 * | 8/2011 | Zybura | G06F 16/1774 | |
| | | | 707/756 | |
| 2011/0213665 A1 * | 9/2011 | Joa | G06Q 30/02 | |
| | | | 705/14.61 | |

(56) References Cited

U.S. PATENT DOCUMENTS

| | | | |
|---|---|---|---|
| 2012/0066346 A1* | 3/2012 | Virmani | G06F 16/164 709/219 |
| 2012/0215747 A1* | 8/2012 | Wang | H04L 67/06 707/690 |
| 2013/0046761 A1* | 2/2013 | Soderberg | G06Q 10/10 707/736 |
| 2013/0060661 A1* | 3/2013 | Block | G06F 21/10 705/26.44 |
| 2013/0074046 A1* | 3/2013 | Sharma | G06F 11/3688 717/126 |
| 2013/0144968 A1* | 6/2013 | Berger | H04L 67/32 709/217 |
| 2017/0237829 A1* | 8/2017 | Kirkeby | H04L 67/06 709/219 |
| 2018/0054438 A1* | 2/2018 | Li | G06F 21/445 |
| 2018/0101678 A1* | 4/2018 | Rosa | G06F 21/562 |
| 2019/0057115 A1* | 2/2019 | Liu | H04L 9/3263 |
| 2019/0097975 A1* | 3/2019 | Martz | H04L 63/0281 |

FOREIGN PATENT DOCUMENTS

| | | |
|---|---|---|
| JP | 2003-030359 A | 1/2003 |
| JP | 2007-299171 A | 11/2007 |

OTHER PUBLICATIONS

Written Opinion for PCT/US2009/032041, dated Aug. 12, 2010.
PCT/US2009/032041—International Search Report dated Jul. 29, 2009; 3 pages.

* cited by examiner

SYSTEM AND METHOD FOR DETECTING THE SOURCE OF MEDIA CONTENT WITH APPLICATION TO BUSINESS RULES

FIELD OF THE DISCLOSURE

This disclosure relates to determining the source of audio or video content available on a network (e.g. the Internet), and using that information to enforce copyright protection and/or business rules for that content.

BACKGROUND OF THE DISCLOSURE

Many people upload copyrighted content to websites without authorization. Websites generally build costly safeguards into their infrastructure to prevent (or minimize) copyright infringement.

SUMMARY OF THE DISCLOSURE

The present disclosure provides a system and method for protecting copyright in content distributed online, in combination with specified business rules. In accordance with an aspect of the disclosure, this is done by analyzing a portion of content presented for upload on a network to detect an image associated with a content owner; comparing a detected image with a set of reference images to identify the owner of the content; and applying business rules to control unauthorized uploading of the content. This image may be a logo of the content owner included in the content as a digital online graphic. Alternatively, the image may be a human face appearing in a video, with the analysis including an automated face recognition procedure. In a case where the content comprises a video, the analysis is advantageously performed on a sample of video frames, or on a segment having a preselected length.

The comparison between the detected image and the reference images may include determining a degree of coincidence between the detected image and a reference image; if the degree of coincidence meets a predetermined criterion, a requirement for additional analysis of the image (e.g. human inspection) may be reported.

The application of business rules may include comparing an identifier of a user presenting the content with a set of authorized user identifiers associated with the content owner; permitting uploading of the content if the user is determined to be authorized; and disposing of the content if the user is determined to be unauthorized. If the user is unauthorized, uploading by that user may still be permitted with the user being charged a fee for subsequent access to the uploaded content.

In accordance with another aspect of the disclosure, a system includes a server configured to implement a method with the above-described features.

The system and method disclosed herein provide a simple, effective way to identify content from the content owners who provide explicit visual cues or non-visual markers so that downstream receivers of the content can use content analysis techniques to determine the form of the content and then to implement appropriate business rules.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

An embodiment will be described below in which video content includes a digital on-line graphic, which serves as a logo for the content owner. It will be appreciated, however, that professionally produced content typically has numerous features (both visual and aural) which may serve as effective identifiers for the content owner, and therefore function as a logo for the owner.

Figure 1:
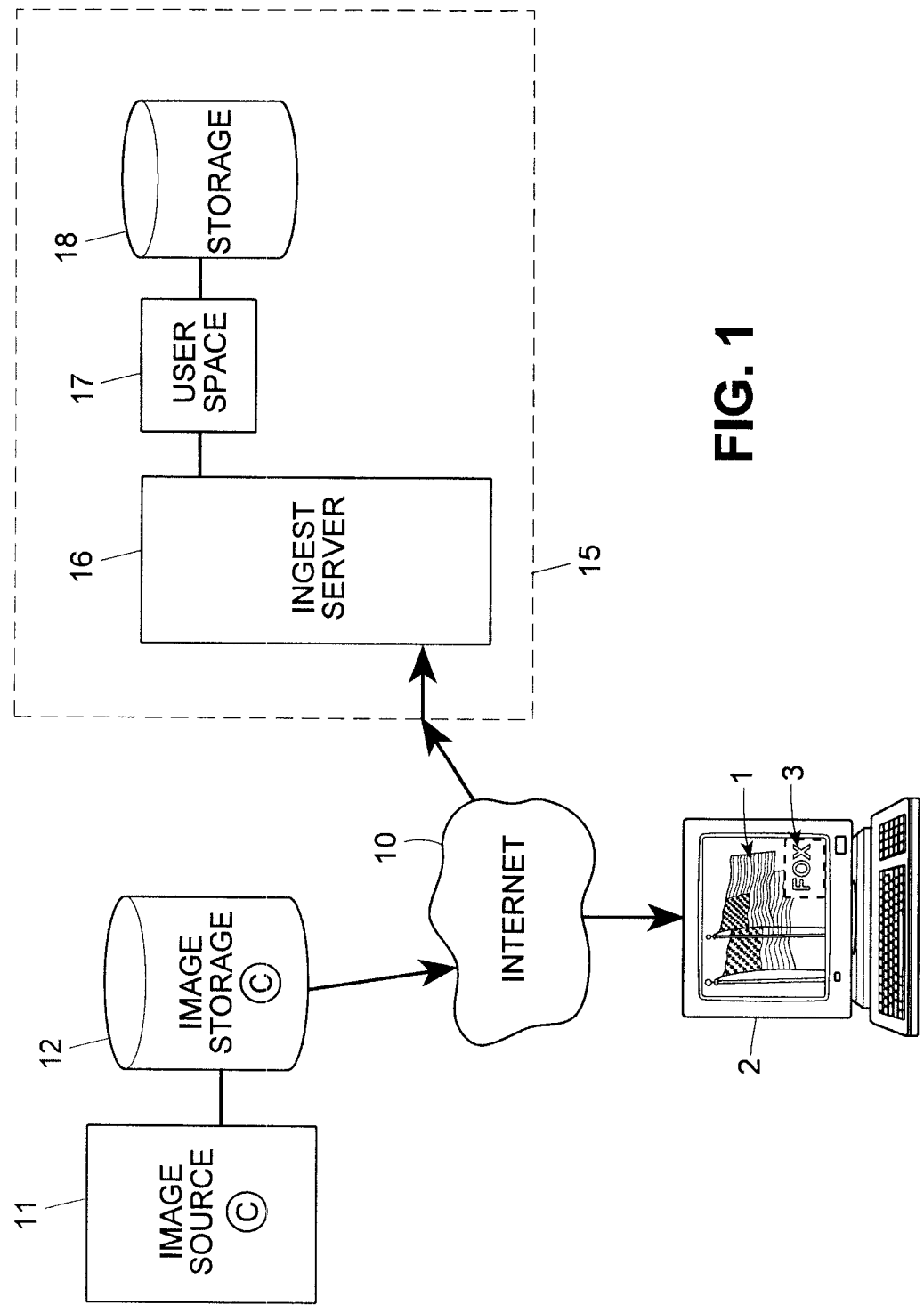
FIG. 1 is a schematic diagram of a system in which a user may download copyrighted content having a logo.

FIG. 1 schematically illustrates downloading of video content 1 to a user device 2 (typically a personal computer). The user of the device sends a request for image content via the Internet 10. The image source 11 may be a publisher or distributor of movies, TV shows, photographs or the like. The image source 11 retrieves the image from a storage device 12 and makes it available for download by the user. The content includes a logo 3 (typically a semi-transparent shape in the lower right corner of the display). The content 1 is typically protected by copyright, so that the user is authorized to view the content but not retain a copy of it. However, in the absence of suitable detection software for copyrighted content, the user still is able to upload the content to a user space 17, accessible via a network 15 maintained by an online application provider such as Yahoo!®, and store the content in storage 18. Typically the content is sent by the user via the Internet to an ingest server 16 of the network 15. It will be appreciated that the video source 11 and storage 12 may themselves be part of network 15.

Figure 2:
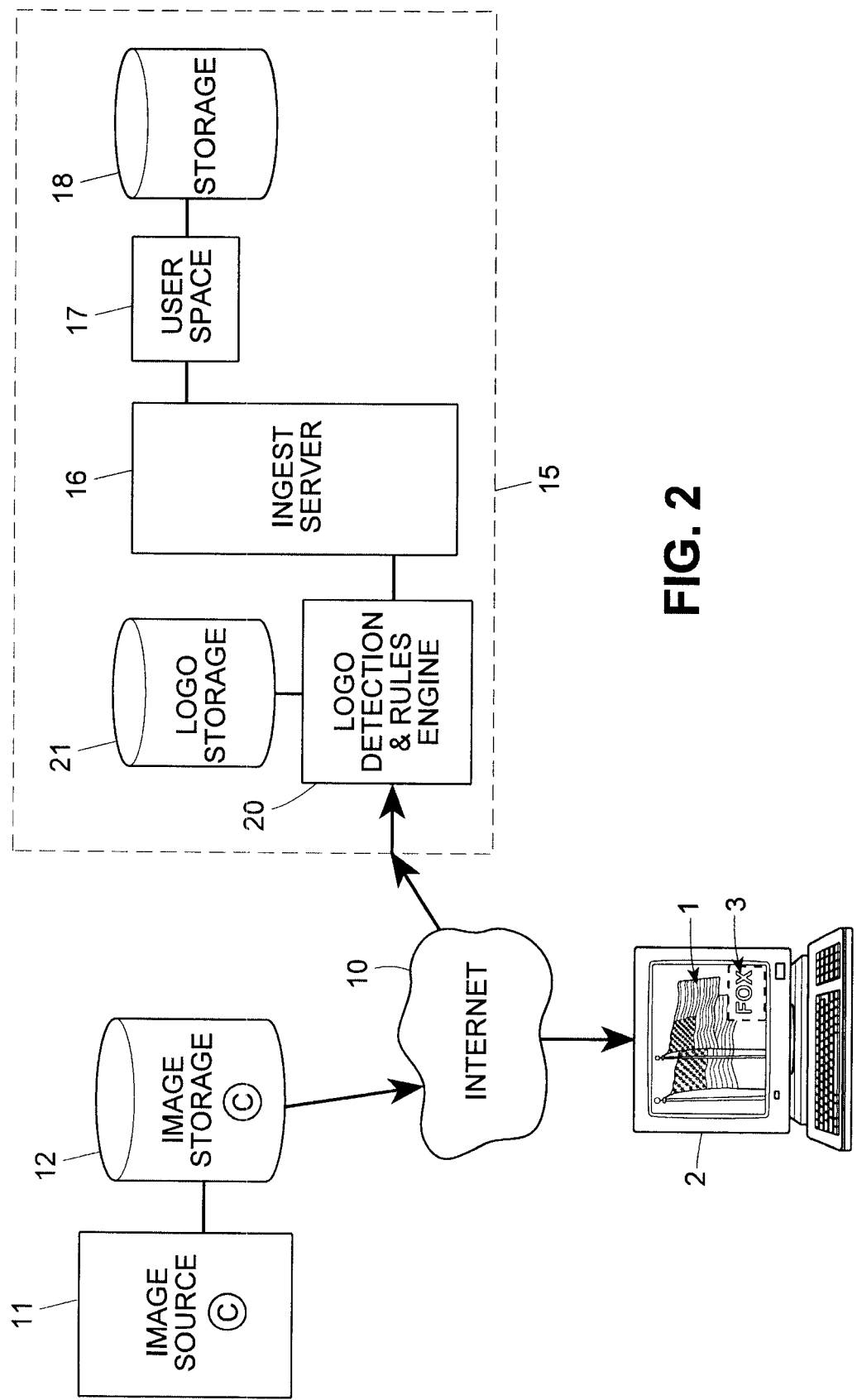
FIG. 2 schematically illustrates a system including a logo detection and business rules engine, in accordance with an embodiment of the disclosure.

FIG. 2 schematically illustrates an embodiment of the disclosure where the network 15 includes a logo detection and rules engine 20 for processing incoming content before that content is accepted by ingest server 16. Although engine 20 is shown separate from ingest server 16, it will be appreciated that the two may operate on the same server hardware. A library of logos is maintained in a storage device 21, for comparison with incoming video content.

Figure 3A:
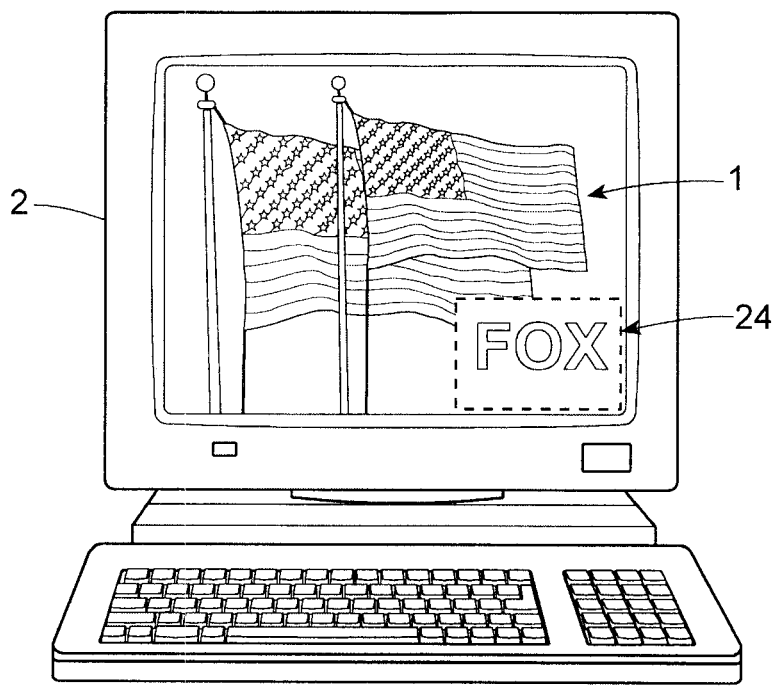
FIGS. 3A and 3B illustrate logos in the form of a digital graphic and human face, respectively.
Figure 3B:

Since most instances of theft of copyrighted content involve premium entertainment content, a wide range of content may be protected by comparing with a relatively small sample size of logos. When the logo is a digital graphic or "bug," the task of finding a logo is simplified by its predictable placement in a corner 24 of a video frame, as illustrated in FIG. 3A. Alternatively, the logo detection may involve recognition of a human face 25 appearing in the frame (FIG. 3B).

Figure 4:
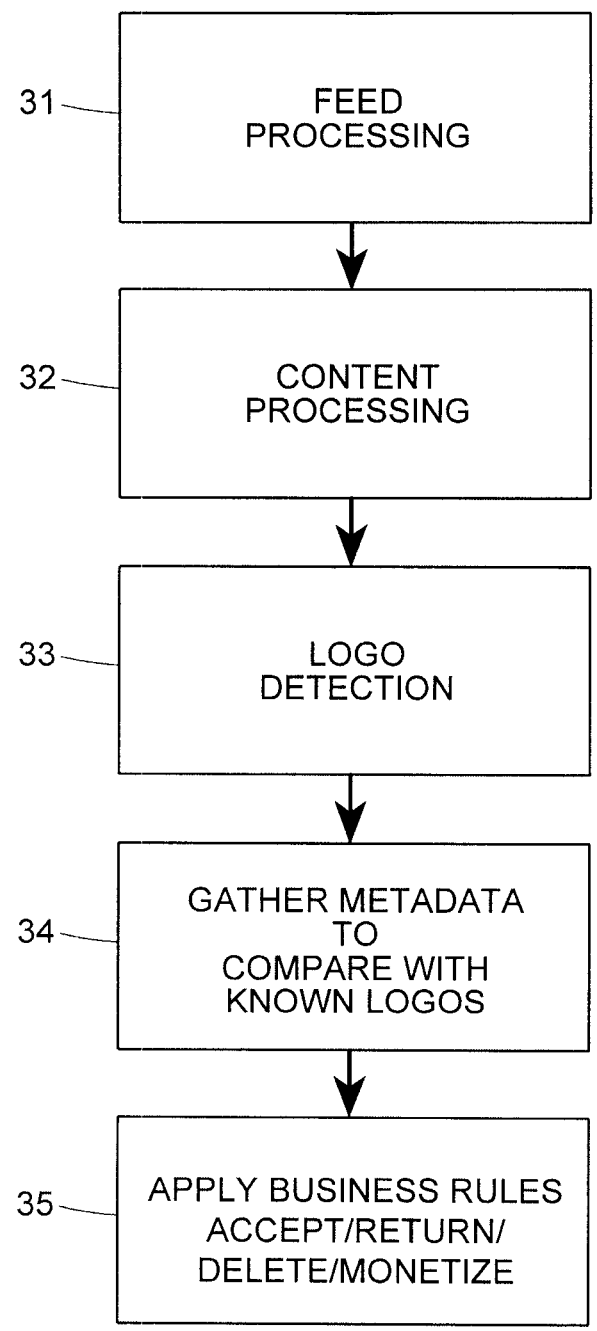
FIG. 4 is a flowchart showing steps in an automated method for detecting copyrighted content, in accordance with an embodiment of the disclosure.

FIG. 4 illustrates steps in a method for detecting a logo using engine 20. The incoming content is fed to the network and staged (step 31). The incoming content then undergoes decompression and transcoding (step 32), e.g. conversion to flash video. The decompressed video, or a portion of it, is then analyzed to detect a logo (step 33). Content analysis techniques such as image recognition may be used to detect the presence of a logo, which may or may not be visible to a human viewer of the content. It is generally not necessary to analyze every frame of the video; the video may be sampled to yield a predetermined number of frames, or a segment of a preselected length may be broken out. For example, it is convenient to analyze a segment about 2½ minutes in length, to overlap the longest expected television commercial break, and thus capture at least some portion of a copyrighted program.

The selected frames or segments are then compared with known logos in predictable spots in each frame (step 34). If a logo is detected in the incoming video, the engine applies business rules (step 35) to determine whether the video content is to be uploaded, discarded, returned to the sender, or uploaded with fees charged to the sender, as discussed in more detail below.

Figure 5:
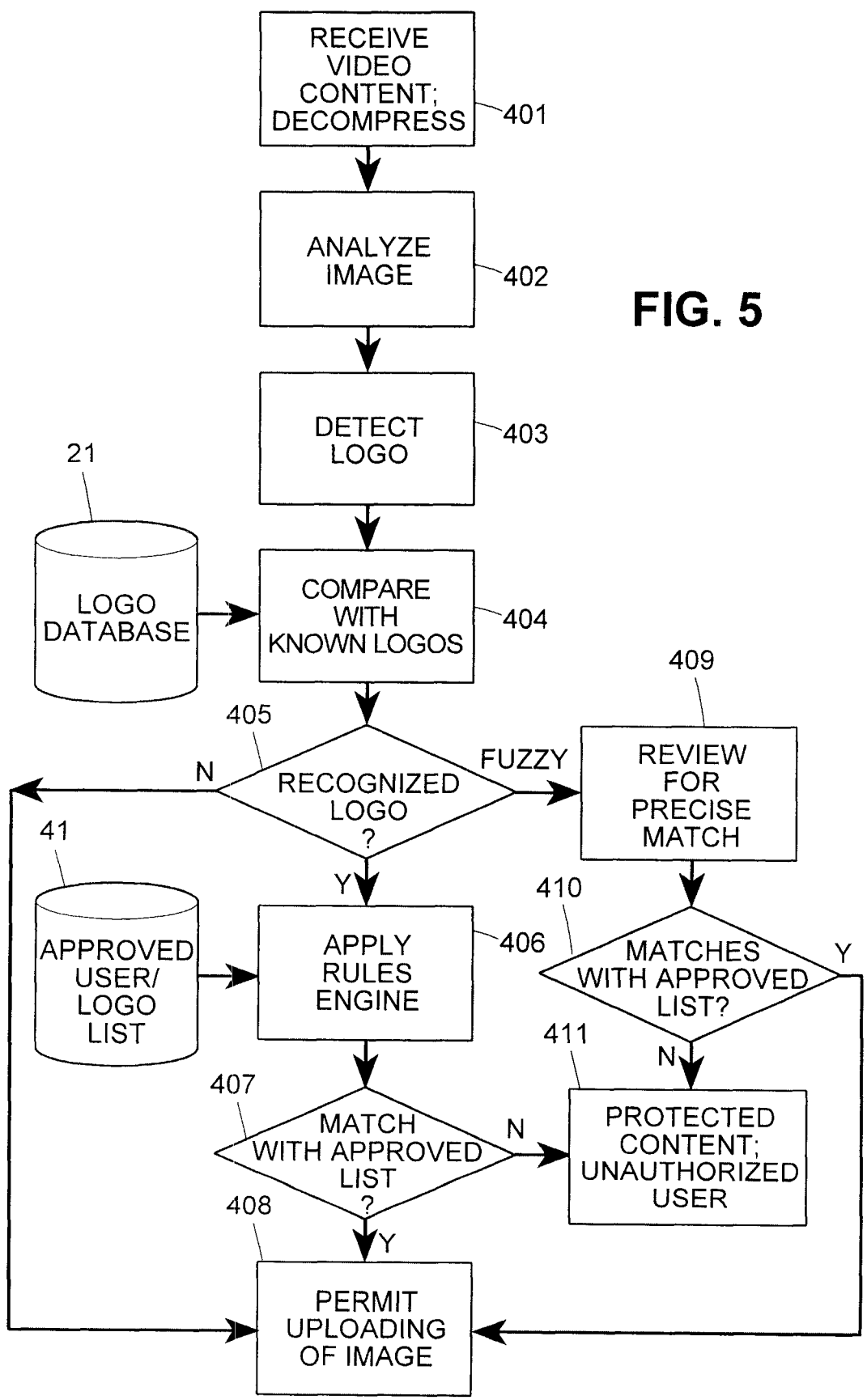
FIG. 5 is a flowchart showing steps in an automated method for detecting a logo and applying relevant business rules, in accordance with an embodiment of the disclosure.

FIG. 5 is a flowchart illustrating additional details of the logo detection and comparison process, according to an embodiment. The video content is received, decompressed and analyzed using content analysis techniques (steps 401, 402). The video content, or a sample thereof, may be analyzed for an on-screen graphic or for some other identifier. Content analysis techniques may include face recognition, voice recognition, OCR, or detection of auxiliary information available in the content (e.g. digital cue-tones indicating broadcast advertising insertion points, or closed caption text recognition). While a logo is often a visible on-screen graphic marking the image (or video frames), automated content analysis techniques are equally effective for logos not visible to the viewer.

Once a logo is detected, it is compared with the sample logos previously provided by the content providers (artists, publishers, distributors, etc.) and stored in database 21 (steps 403, 404). If the logo is clearly identified, that identifying information for the video content is input to a business rules engine for further action (step 405). In an embodiment, the logo may not precisely coincide with one of the sample logos, but may coincide to some predetermined degree; that is a "fuzzy" match with a known logo at, for example, 90% coincidence. If a "fuzzy" match is found, the rules engine may issue a report alerting a human reviewer to the appearance of the logo. The content may then be subjected to other processes, including off-line review (step 409), to determine a more precise match with a known logo.

If no logo is recognized, uploading of the content is permitted (step 408). If the content includes a known logo, the business rules engine determines the disposition of the content (step 406). For example, each known logo may have a list of approved users (aggregators, affiliates, or simply "approved uploaders") associated therewith. If the user attempting to upload the content is on the approved list (step 407, 410), then uploading is permitted. Otherwise, the rules engine determines that the content is protected, and the user submitting the content is unauthorized (step 411).

Figure 6:
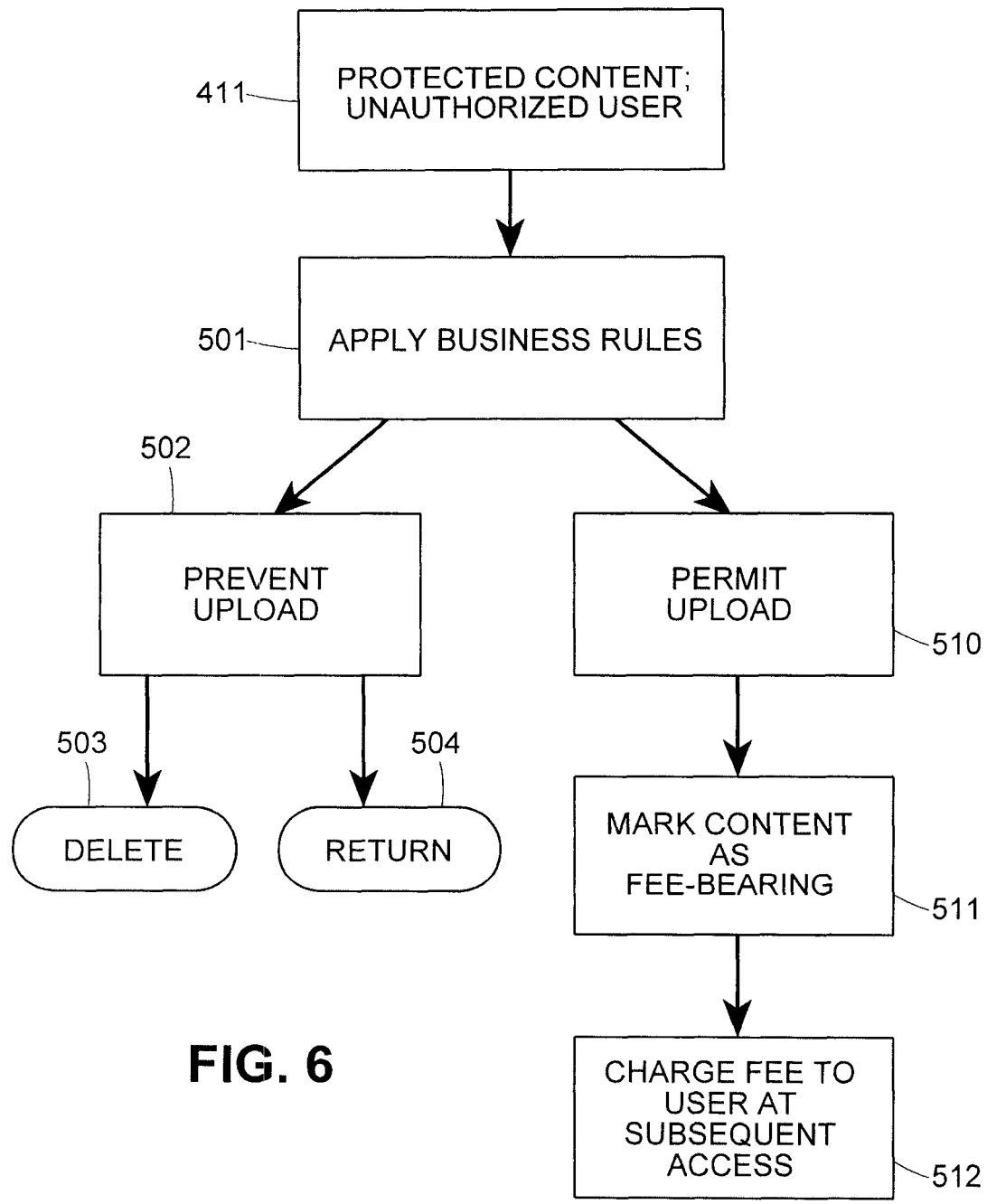
FIG. 6 is a flowchart illustrating an automated business process for enforcing a content owner's copyright, in accordance with another aspect of the disclosure.

The business rules engine may establish several possible ways to dispose of content submitted for upload by an unauthorized user. FIG. 6 is a flowchart schematically illustrating alternative methods of disposing of content. The business rules that are applied (step 501) reflect previously established policies of the particular content owner. At the content owner's direction, the unauthorized upload may be prevented (step 502) or may be permitted (step 503) with conditions imposed on the user. When the upload of the content is prevented, the content may be simply deleted (step 503) or returned to the user (step 504). The engine may also take further action to mark the event (e.g. make an entry in a file, send a message to the content owner, etc.).

Alternatively, the content owner may choose to permit the user to upload its content, in order to derive revenue therefrom (step 510). In an embodiment, the rules engine marks the uploaded content (step 511) and keeps a record of subsequent access of the content by the user. The administrator of network 15 may then charge a fee each time the content is played, thereby providing revenue for the content owner (step 512). In this instance, the rules engine may attach attribution information to the content before it is uploaded.

The rules applied to unauthorized users need not be the same for every content owner, or every item of content. For example, one owner may choose to block all attempted uploads of its content, while another owner may choose to permit uploads of preselected items; a user attempting to upload a popular, recently released movie may be charged a higher fee than for an older movie.

It will be appreciated that the system and method disclosed herein may be used to protect both visual and non-visual (e.g. aural or tonal) copyrighted content. In particular, a tonal logo may be used to identify the owner of video or audio content.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A method comprising:
    receiving, at a content server, a request from a user to upload a digital content item to a website, the digital content item associated with a content owner and comprising digital content, said content owner associated with a set of authorized users approved to upload content;
    identifying, by the content server, the digital content item;
    analyzing, by the content server implementing a computerized content analysis technique, the digital content item, and based on said analysis, determining a type of the digital content item and detecting, based on said type determination, a portion of the content that comprises a displayable image associated with the content owner;
    identifying, via the content server based upon said analysis, a set of reference images associated with said set of authorized users;
    comparing, by the content server, the detected image portion with each reference image in the identified set of reference images, said comparison resulting in an identification that the detected image portion is associated with an authorized user of said set of authorized users;

accessing, by the content server, information associated with the set of authorized users comprising identifiers of the users approved for uploading said content;

comparing, by the content server, an identifier of the user requesting to upload said digital content item to said website with the identifiers of the set of authorized users;

determining, by the content server based on said identifier comparison, whether the user requesting to upload said digital content item is authorized to upload said digital content item; and applying, via the content server, instructions to the digital content item, said instructions preventing said upload when said requesting user is identified as an unauthorized user and, said instructions enabling the device of the requesting user to complete the request to upload the digital content item when said requesting user is determined to be authorized.

2. A method according to claim 1, wherein the image detected from the portion of content presented for upload to a website is a digital graphic comprising a logo of the content owner.

3. A method according to claim 1, wherein the image detected from the portion of content presented for upload to a website includes a human face, and said analyzing includes an automated face recognition procedure.

4. A method according to claim 1, wherein said comparing further comprises determining a degree of coincidence between the detected image and a reference image; and if the degree of coincidence meets a predetermined criterion, reporting a requirement for additional analysis of the detected image.

5. A method according to claim 4, wherein said additional analysis comprises human inspection.

6. A method according to claim 1, wherein said content comprises video frames, and said analyzing is performed on a sample of said frames.

7. A method according to claim 1, wherein said portion is a segment of a video program, the segment having a preselected length.

8. A content server comprising:

a processor; and a non-transitory computer-readable storage medium for tangibly storing thereon program logic for execution by the processor, the program logic comprising:

logic executed by the processor for receiving a request from a user to upload a digital content item to a website, the digital content item associated with a content owner and comprising digital content, said content owner associated with a set of authorized users approved to upload content;

logic executed by the processor for identifying the digital content item;

logic executed by the processor for analyzing, by the content server implementing a computerized content analysis technique, the digital content item, and based on said analysis, determining a type of the digital content item and detecting, based on said type determination, a portion of the content that comprises a displayable image associated with the content owner;

logic executed by the processor for identifying, based upon said analysis, a set of reference images associated with said set of authorized users;

logic executed by the processor for comparing the detected image portion with each reference image in the identified set of reference images, said comparison resulting in an identification that the detected image portion is associated with an authorized user of said set of authorized users;

logic executed by the processor for accessing information associated with the set of authorized users comprising identifiers of the users approved for uploading said content;

logic executed by the processor for comparing an identifier of the user requesting to upload said digital content item to said website with the identifiers of the set of authorized users;

logic executed by the processor for determining, based on said identifier comparison, whether the user requesting to upload said digital content item is authorized to upload said digital content item; and logic executed by the processor for applying instructions to the digital content item, said preventing said upload when said requesting user is identified as an unauthorized user and, said instructions enabling the device of the requesting user to complete the request to upload the digital content item when said requesting user is determined to be authorized.

9. A content server according to claim 8, wherein the image detected from the portion of content presented for upload to a website is a digital graphic comprising a logo of the content owner.

10. A content server according to claim 8, wherein the image detected from the portion of content presented for upload to a website is a human face, and said server is configured to analyze said content using an automated face recognition procedure.

11. A content server according to claim 8, wherein said server is configured to determine a degree of coincidence between the detected image and a reference image, and where the degree of coincidence meets a predetermined criterion, to report a requirement for additional analysis of the detected image.

12. A content server according to claim 8, wherein said content comprises video frames, and said server is configured to analyze a sample of said frames.

13. A non-transitory computer-readable storage medium tangibly encoded with computer-executable instructions, that when executed by a processor associated with a content server, performs a method comprising:

receiving, at the content server, a request from a user to upload a digital content item to a website, the digital content item associated with a content owner and comprising digital content, said content owner associated with a set of authorized users approved to upload content;

identifying, by the content server, the digital content item;

analyzing, by the content server implementing a computerized content analysis technique, the digital content item, and based on said analysis, determining a type of the digital content item and detecting, based on said type determination, a portion of the content that comprises a displayable image associated with the content owner;

identifying, via the content server based upon said analysis, a set of reference images associated with said set of authorized users;

comparing, by the content server, the detected image portion with each reference image in the identified set of reference images, said comparison resulting in an identification that the detected image portion is associated with an authorized user of said set of authorized users;

accessing, by the content server, information associated with the set of authorized users comprising identifiers of the users approved for uploading said content;

comparing, by the content server, an identifier of the user requesting to upload said digital content item to said website with the identifiers of the set of authorized users;

determining, by the content server based on said identifier comparison, whether the user requesting to upload said digital content item is authorized to upload said digital content item; and applying, via the content server, instructions to the digital content item, said preventing said upload when said requesting user is identified as an unauthorized user and, said instructions enabling the device of the requesting user to complete the request to upload the digital content item when said requesting user is determined to be authorized.

14. A non-transitory computer-readable storage medium according to claim 13, wherein the image is a digital graphic comprising a logo of the content owner.

* * * * *